(12) United States Patent  
Ono et al.

(10) Patent No.: US 12,425,949 B2
(45) Date of Patent: Sep. 23, 2025

(54) CONTROL SYSTEM AND CONTROL METHOD

(71) Applicant: RAKUTEN MOBILE, INC., Tokyo (JP)

(72) Inventors: Makoto Ono, Tokyo (JP); Kazushige Takeuchi, Tokyo (JP); Masahiro Kojima, Tokyo (JP)

(73) Assignee: RAKUTEN MOBILE, INC., Tokyo (JP)

( * ) Notice: Subject to any disclaimer, the term of this patent is extended or adjusted under 35 U.S.C. 154(b) by 0 days.

(21) Appl. No.: 18/030,771

(22) PCT Filed: Nov. 30, 2021

(86) PCT No.: PCT/JP2021/043919
§ 371 (c)(1),
(2) Date: Apr. 7, 2023

(87) PCT Pub. No.: WO2023/100254
PCT Pub. Date: Jun. 8, 2023

(65) Prior Publication Data
US 2023/0413157 A1 Dec. 21, 2023

(51) Int. Cl.
*H04W 40/32* (2009.01)
*H04W 40/24* (2009.01)

(52) U.S. Cl.
CPC ......... *H04W 40/32* (2013.01); *H04W 40/248* (2013.01)

(58) Field of Classification Search
CPC ... H04W 40/32; H04W 40/248; H04W 52/02; H04W 88/08
See application file for complete search history.

(56) References Cited

U.S. PATENT DOCUMENTS

2013/0102301 A1* 4/2013 Shinada ............... H04W 28/12
455/418
2013/0343358 A1 12/2013 Kato et al.
(Continued)

FOREIGN PATENT DOCUMENTS

EP          2590443 A1    5/2013
JP        2016-5099 A     1/2016
(Continued)

OTHER PUBLICATIONS

International Search Report in PCT Application No. PCT/JP2021/043916, mailed Feb. 22, 2022, 3pp.
(Continued)

*Primary Examiner* — Hashim S Bhatti
(74) *Attorney, Agent, or Firm* — HAUPTMAN HAM, LLP

(57) ABSTRACT

An operation control module executes, for each of a plurality of base station system groups, operation control corresponding to a degree of operation of a leader base station system included in the base station system group, with respect to a follower base station system included in the base station system group. A removal module removes, in accordance with a fact that a magnitude of a deviation of a ratio of the degree of operation of a follower base station system included in one of the base station system groups with respect to the degree of operation of a leader base station system included in the base station system group from a given reference ratio has satisfied a predetermined condition, the follower base station system from the base station system group.

11 Claims, 15 Drawing Sheets

(56) References Cited

U.S. PATENT DOCUMENTS

| | | |
|---|---|---|
| 2014/0051419 A1 | 2/2014 | Brend et al. |
| 2014/0269257 A1* | 9/2014 | Mandiganal et al. |
| 2016/0286479 A1* | 9/2016 | Karkera ............... H04W 24/02 |
| 2016/0342198 A1 | 11/2016 | Hsu et al. |
| 2016/0353512 A1 | 12/2016 | Lu et al. |
| 2018/0249406 A1 | 8/2018 | Tellado et al. |
| 2020/0134394 A1 | 4/2020 | Teshome et al. |
| 2022/0256363 A1 | 8/2022 | Sun et al. |

FOREIGN PATENT DOCUMENTS

| | | |
|---|---|---|
| JP | 2017-504244 A | 2/2017 |
| WO | 2011/136267 A1 | 11/2011 |
| WO | 2012/001772 A1 | 1/2012 |

OTHER PUBLICATIONS

International Search Report in PCT Application No. PCT/JP2021/043921, mailed Mar. 8, 2022, 3pp.

\* cited by examiner

FIG.7

|     | 001       | 002       | 003       | 004       | 005       | 006       |
|-----|-----------|-----------|-----------|-----------|-----------|-----------|
| 001 |           | (0.1,50)  | (0.3,-40) | (0.6,20)  | (0.2,-10) | (0.9,5)   |
| 002 | (0.1,-50) |           | (0.5,-20) | (0.7,10)  | (0.5,25)  | (0.1,50)  |
| 003 | (0.3,40)  | (0.5,20)  |           | (0.8,15)  | (0.5,30)  | (0.7,-40) |
| 004 | (0.6,-20) | (0.7,-10) | (0.8,-15) |           | (0.9,-20) | (0.1,70)  |
| 005 | (0.2,10)  | (0.5,-25) | (0.5,-30) | (0.9,20)  |           | (0.4,70)  |
| 006 | (0.9,-5)  | (0.1,-50) | (0.7,40)  | (0.1,-70) | (0.4,-70) |           |

FIG.9

| | DEGREE-OF-OPERATION DATA |
|---|---|
| TRAFFIC AMOUNT DATA | T1 |

PERFORMANCE INDEX VALUE DATA

| P-STATE DATA | AVERAGE PROCESSING TIME DATA | AVERAGE PACKET DISCARD RATE DATA |
|---|---|---|
| P1 | a1 | b1 |
| P2 | a2 | b2 |
| P3 | a3 | b3 |
| P4 | a4 | b4 |
| P5 | a5 | b5 |
| P6 | a6 | b6 |

FIG.12

|  | 0:00:00 | 0:00:03 | 0:00:06 |
|---|---|---|---|
| 101 | T11 | T21 | T31 |
| 102 | T12'=T12/p12 | T22'=T22/p12 | T32'=T32/p12 |
| 103 | T13'=T13/p13 | T23'=T23/p13 | T33'=T33/p13 |
| 104 | T14'=T14/p14 | T24'=T24/p14 | T34'=T34/p14 |
| 105 | T15'=T15/p15 | T25'=T25/p15 | T35'=T35/p15 |
| 106 | T16'=T16/p16 | T26'=T26/p16 | T36'=T36/p16 |

CONTROL SYSTEM AND CONTROL METHOD

RELATED APPLICATIONS

The present application is a National Phase of International Application Number PCT/JP2021/043919, filed Nov. 30, 2021.

TECHNICAL FIELD

The present invention relates to a control system and a control method.

BACKGROUND ART

There is known a technology of executing, in accordance with a degree of operation of a certain base station system (hereinafter referred to as "leader base station system") included in a base station system group, operation control of a different base station system (hereinafter referred to as "follower base station system") included in this base station system group. As an example of such a technology, in Patent Literature 1, there is described a configuration in which, when a determination value calculated based on information on a radio base station which has the same group ID as that of a selected radio base station and is in an operation ON state is smaller than a threshold value, the selected radio base station is changed to an operation OFF state.

CITATION LIST

Patent Literature

[Patent Literature 1] JP 2016-005099 A

SUMMARY OF INVENTION

Technical Problem

In a situation in which the operation control of the follower base station system is performed in accordance with the degree of operation of the leader base station system, in some cases, a tendency of a transition of the degree of operation of a specific follower base station system changes for some reasons such as an increase of the number of subscribers in a specific area, for example.

Such a follower base station system is brought into a state in which the operation control corresponding to the degree of operation of the leader base station system cannot be accurately performed. Thus, this follower base station system should no longer be included in this base station system group including this follower base station system.

The present invention has been made in view of the above-mentioned circumstances, and has an object to provide a control system and a control method which are capable of accurately removing a follower base station system which should not be included in a base station system group from this base station system group.

Solution to Problem

In order to solve the above-mentioned problem, according to one embodiment of the present invention, there is provided a control system including: degree-of-correlation identification means for identifying, for each pair of base station systems included in a plurality of base station systems, a degree of correlation of a transition of a degree of operation between the each pair of base station systems; classification means for classifying, based on the degree of correlation identified for the each pair of base station systems, the plurality of base station systems into a plurality of base station system groups; operation control means for executing, for each of the plurality of base station system groups, operation control corresponding to the degree of operation of a leader base station system included in the each of the plurality of base station system groups, with respect to a follower base station system included in the each of the plurality of base station system groups; and removal means for removing, in accordance with a fact that a magnitude of a deviation of a ratio of the degree of operation of a follower base station system included in one of the plurality of base station system groups with respect to the degree of operation of a leader base station system included in the one of the plurality of base station system groups from a given reference ratio has satisfied a predetermined condition, the follower base station system from the one of the plurality of base station system groups.

In one aspect of the present invention, the degree-of-correlation identification means is configured to identify the degree of correlation of the transition of the degree of operation for the each pair of base station systems based on transition data indicating the transition of the degree of operation of each of the plurality of base station systems, the control system further includes ratio identification means for identifying, based on the transition data, the given reference ratio being the ratio of the degree of operation of the follower base station system included in the one of the plurality of base station system groups with respect to the degree of operation of the leader base station system included in the one of the plurality of base station system groups, and the removal means is configured to remove the follower base station system from the one of the plurality of base station system groups in accordance with a fact that a magnitude of a difference between a value indicating the degree of operation of the leader base station system included in the one of the plurality of base station system groups and a value obtained by dividing a value indicating the degree of operation of the follower base station system included in the one of the plurality of base station system groups by the given reference ratio has satisfied a predetermined condition.

As another aspect, the degree-of-correlation identification means is configured to identify the degree of correlation of the transition of the degree of operation for the each pair of base station systems based on transition data indicating the transition of the degree of operation of each of the plurality of base station systems, the control system further includes ratio identification means for identifying, based on the transition data, the given reference ratio being the ratio of the degree of operation of the follower base station system included in the one of the plurality of base station system groups with respect to the degree of operation of the leader base station system included in the one of the plurality of base station system groups, and the removal means is configured to remove the follower base station system from the one of the plurality of base station system groups in accordance with a fact that a magnitude of a difference between a value obtained by multiplying a value indicating the degree of operation of the leader base station system included in the one of the plurality of base station system groups by the given reference ratio and a value indicating the degree of operation of the follower base station system included in the one of the plurality of base station system groups has satisfied a predetermined condition.

In those aspects, the removal means may be configured to remove the follower base station system satisfying a condition that a distribution of the differences identified a plurality of times is different from the distribution of another follower base station system, from the one of the plurality of base station system groups.

Further, the removal means may be configured to remove the follower base station system in which a magnitude of a variance or a standard deviation of the differences identified a plurality of times satisfies a predetermined condition, from the one of the plurality of base station system groups.

As another aspect, the removal means may be configured to remove the follower base station system in which an average of the differences identified a plurality of times satisfies a predetermined condition, from the one of the plurality of base station system groups.

Further, in one aspect of the present invention, the control system further includes prediction means for predicting the degree of operation of the leader base station system, the operation control means is configured to execute operation control of the leader base station system based on the degree of operation being a result of the predicting, and the operation control means is configured to execute the operation control of the follower base station system based on the degree of operation being the result of the predicting and on the given reference ratio.

Further, in one aspect of the present invention, the control system further includes leader determination means for determining, from among a plurality of base station systems included in the one of the plurality of base station system groups, the leader base station system based on the number of other base station systems in each of which the degree of correlation with respect to a corresponding one of the plurality of base station systems is larger than a predetermined magnitude.

Further, in one aspect of the present invention, the degree-of-correlation identification means is configured to identify, as the degree of correlation, a representative value of a cross-correlation coefficient of a value indicating the degree of operation.

Further, in one aspect of the present invention, the degree of operation of each of the plurality of base station systems is a traffic amount or the number of accommodated persons in an area covered by the each of the plurality of the base station systems.

Further, according to one embodiment of the present invention, there is provided a control method including the steps of: identifying, for each pair of base station systems included in a plurality of base station systems, a degree of correlation of a transition of a degree of operation between the each pair of base station systems; classifying, based on the degree of correlation identified for the each pair of base station systems, the plurality of base station systems into a plurality of base station system groups; executing, for each of the plurality of base station system groups, operation control corresponding to the degree of operation of a leader base station system included in the each of the plurality of base station system groups, with respect to a follower base station system included in the each of the plurality of base station system groups; and removing, in accordance with a fact that a magnitude of a deviation of a ratio of the degree of operation of a follower base station system included in one of the plurality of base station system groups with respect to the degree of operation of a leader base station system included in the one of the plurality of base station system groups from a given reference ratio has satisfied a predetermined condition, the follower base station system from the one of the plurality of base station system groups.

BRIEF DESCRIPTION OF DRAWINGS

FIG. 7 is a table for schematically showing an example of degree-of-correlation data.

FIG. 9 is a diagram for illustrating an example of correspondence data.

FIG. 12 is a table for schematically showing an example of degrees of operation of the base station systems.

DESCRIPTION OF EMBODIMENTS

One embodiment of the present invention is now described in detail with reference to the drawings.

Figure 1:
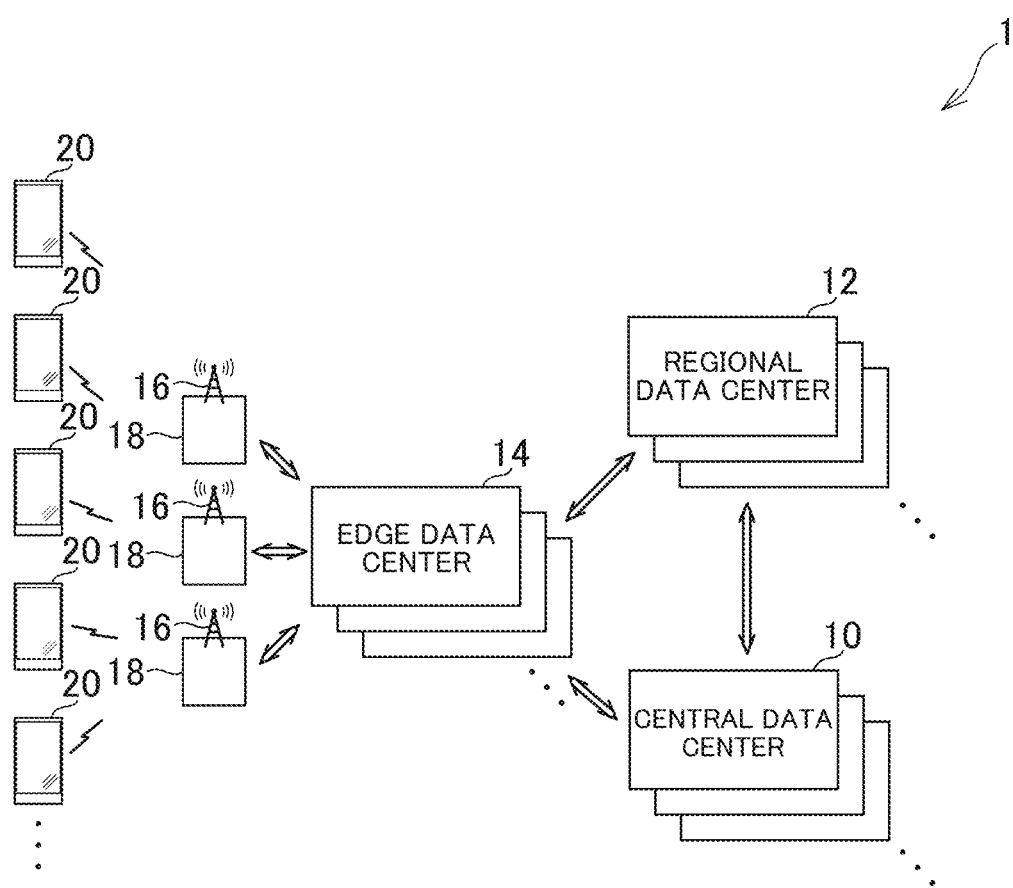
FIG. 1 is a diagram for illustrating an example of a communication system in one embodiment of the present invention.
Figure 2:
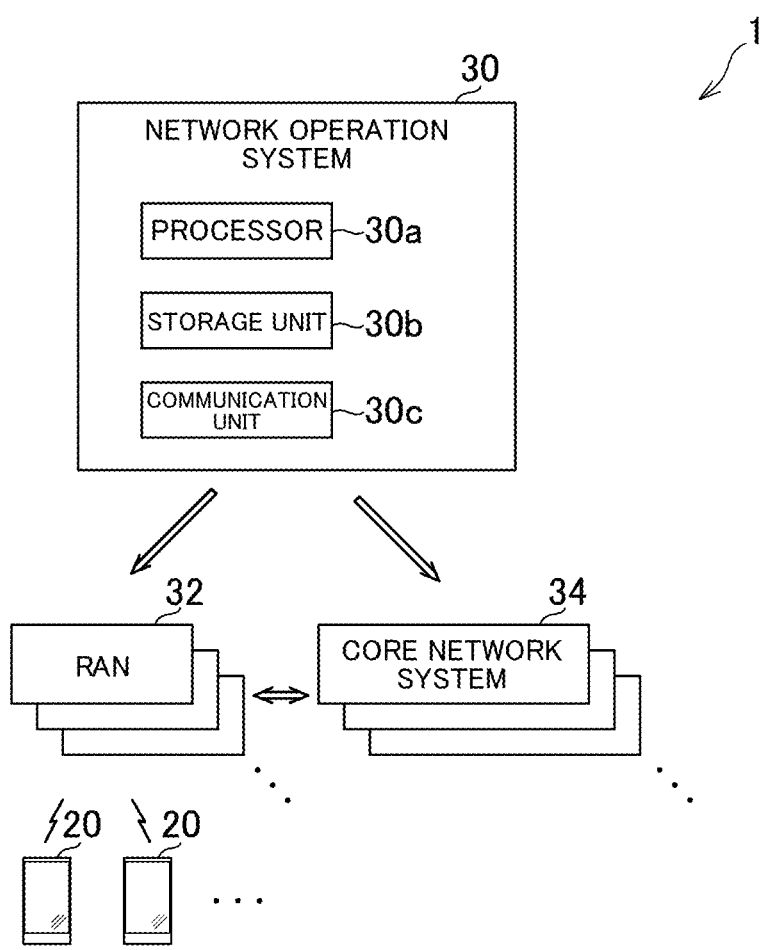
FIG. 2 is a diagram for illustrating the example of the communication system in the one embodiment of the present invention.

FIG. 1 and FIG. 2 are diagrams for illustrating an example of a communication system 1 in the one embodiment of the present invention. FIG. 1 is a diagram focusing on locations of a group of data centers included in the communication system 1. FIG. 2 is a diagram focusing on various types of computer systems implemented by the group of data centers included in the communication system 1.

As illustrated in FIG. 1, the group of data centers included in the communication system 1 is classified into central data centers 10, regional data centers 12, and edge data centers 14.

For example, several central data centers 10 are arranged in a dispersed manner in an area covered by the communication system 1 (for example, in Japan).

For example, several tens of regional data centers 12 are arranged in a dispersed manner in the area covered by the communication system 1. For example, when the area covered by the communication system 1 is the entire area of Japan, one or two regional data centers 12 may be arranged in each prefecture.

For example, several thousands of edge data centers 14 are arranged in a dispersed manner in the area covered by the communication system 1. Further, each of the edge data centers 14 can perform communication to/from a communication facility 18 including an antenna 16. In this case, as illustrated in FIG. 1, one edge data center 14 may be able to perform communication to/from several communication facilities 18. The communication facility 18 may include a computer such as a server computer. The communication facility 18 in this embodiment performs radio communication to/from a user equipment (UE) 20 via the antenna 16.

A plurality of servers are arranged in each of the central data center 10, the regional data center 12, and the edge data center 14 in this embodiment.

In this embodiment, for example, the central data center 10, the regional data center 12, and the edge data center 14 are able to perform communication to/from one another. Further, communication is also allowed between the central data centers 10, between the regional data centers 12, and between the edge data centers 14.

As illustrated in FIG. 2, the communication system 1 in this embodiment includes a network operation system (NOS) 30, a plurality of radio access networks (RANs) 32, a plurality of core network systems 34, and a plurality of UEs 20. The core network system 34, the RAN 32, and the UE 20 cooperate with each other so that a mobile communication network is achieved.

The RAN 32 is a computer system corresponding to an eNodeB (eNB) in a fourth generation mobile communication system (hereinafter referred to as "4G") or an NR base station (gNB) in a fifth generation mobile communication system (hereinafter referred to as "5G"), and is a computer system including the antenna 16. The RAN 32 in this embodiment is mainly implemented by the communication facility 18 and a group of servers arranged in the edge data center 14. A part of the RAN 32 (for example, a virtual distributed unit (vDU) and a virtual central unit (vCU) in 4G, or a distributed unit (DU) and a central unit (CU) in 5G) may be implemented by the central data center 10 or the regional data center 12 instead of the edge data center 14.

The core network system 34 is a system corresponding to an evolved packet core (EPC) in 4G or a 5G core (5GC) in 5G. The core network system 34 in this embodiment is mainly implemented by a group of servers arranged in the central data center 10 or the regional data center 12.

The NOS 30 in this embodiment is configured, for example, on a cloud platform and includes a processor 30a, a storage unit 30b, and a communication unit 30c, as illustrated in FIG. 2. The processor 30a is a program control device such as a microprocessor which operates in accordance with a program installed in the NOS 30. The storage unit 30b is, for example, a storage element such as a ROM or RAM, a solid state drive (SSD), a hard disk drive (HDD), or the like. The storage unit stores a program to be executed by the processor 30a, and the like. The communication unit 30c is, for example, a communication interface such as an NIC or a wireless LAN module. Software-defined networking (SDN) may be implemented by the communication unit 30c. The communication unit 30c transmits and receives data to and from the RAN 32 and the core network system 34.

In this embodiment, the NOS 30 is implemented by a group of servers arranged in the central data center 10. The NOS 30 may be implemented by a group of servers arranged in the regional data center 12.

The communication system 1 in this embodiment provides network services such as a voice communication service and a data communication service to users who use the UE 20.

The network service provided in this embodiment is not limited to a voice communication service and a data communication service. The network service provided in this embodiment may be, for example, an IoT service.

In this embodiment, a container type application execution environment such as Docker is installed in the servers arranged in the central data center 10, the regional data center 12, and the edge data center 14, and containers can be deployed in those servers and operated. In those servers, clusters (Kubernetes clusters) managed by a container management tool such as the Kubernetes may be constructed. After that, a container-type application may be executed by a processor on the constructed cluster.

Further, the network service provided in this embodiment is implemented by a containerized network function (CNF), which is a container-based functional unit.

Figure 3:
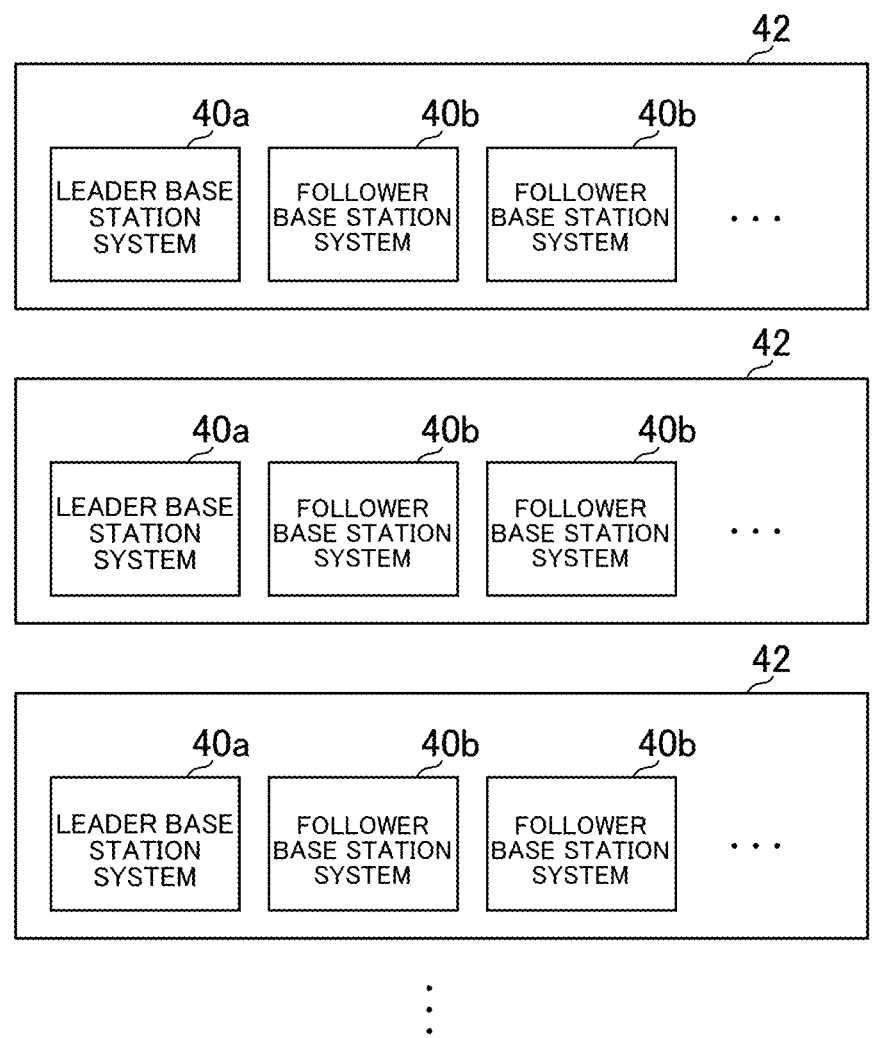
FIG. 3 is a diagram for schematically illustrating an example of classification of base station systems.

As illustrated in FIG. 3, the communication system 1 in this embodiment includes a plurality of base station systems 40.

In this case, for example, when no components of the RAN 32 are incorporated in the central data center 10 or the regional data center 12, the above-mentioned base station system 40 refers to a system corresponding to the RAN 32 constructed in one edge data center 14.

Further, in some cases, a part of the components of the RAN 32 is incorporated in the central data center 10 or the regional data center 12. For example, it is assumed that a component of the RAN 32 constructed in one edge data center 14 and a component of the RAN 32 constructed in the central data center 10 or the regional data center 12 cooperate with each other. In this case, the above-mentioned base station system 40 refers to a system corresponding to the RAN 32 including those components cooperating with each other.

In addition, as illustrated in FIG. 3, in this embodiment, for example, the plurality of base station systems 40 included in the communication system 1 are classified into a plurality of base station system groups 42.

Each of the base station system groups 42 includes a leader base station system 40a being a representative base station system 40 of this base station system group 42, and a follower base station system 40b being a base station system 40 other than the leader base station system 40a.

Further, the NOS 30 predicts, for example, at intervals of a predetermined unit period t1 (for example, 30 minutes), for the leader base station system 40a, a degree of operation (for example, a traffic amount or the number of accommodated persons) in a next unit period t1 in this leader base station system 40a. The NOS 30 may predict the degree of operation, for example, at the intervals of the predetermined unit period t1 based on the number of accommodated persons or the traffic amount in this unit period t1 and a time associated with this unit period t1 (for example, a start time or an end time of this unit period t1). In this case, the degree of operation may be predicted through use of a trained machine learning model.

In addition, in this embodiment, the operation control of all of the base station systems 40 included in the base station system group 42 is performed based on the degree of operation being the prediction result for the leader base station system 40a included in this base station system group 42.

Description is further given of functions of the NOS 30 in this embodiment and processes executed by the NOS 30 while focusing on classification of the base station systems 40 in this embodiment (grouping of the base station systems 40) and operation control of the base station systems 40.

Figure 4:
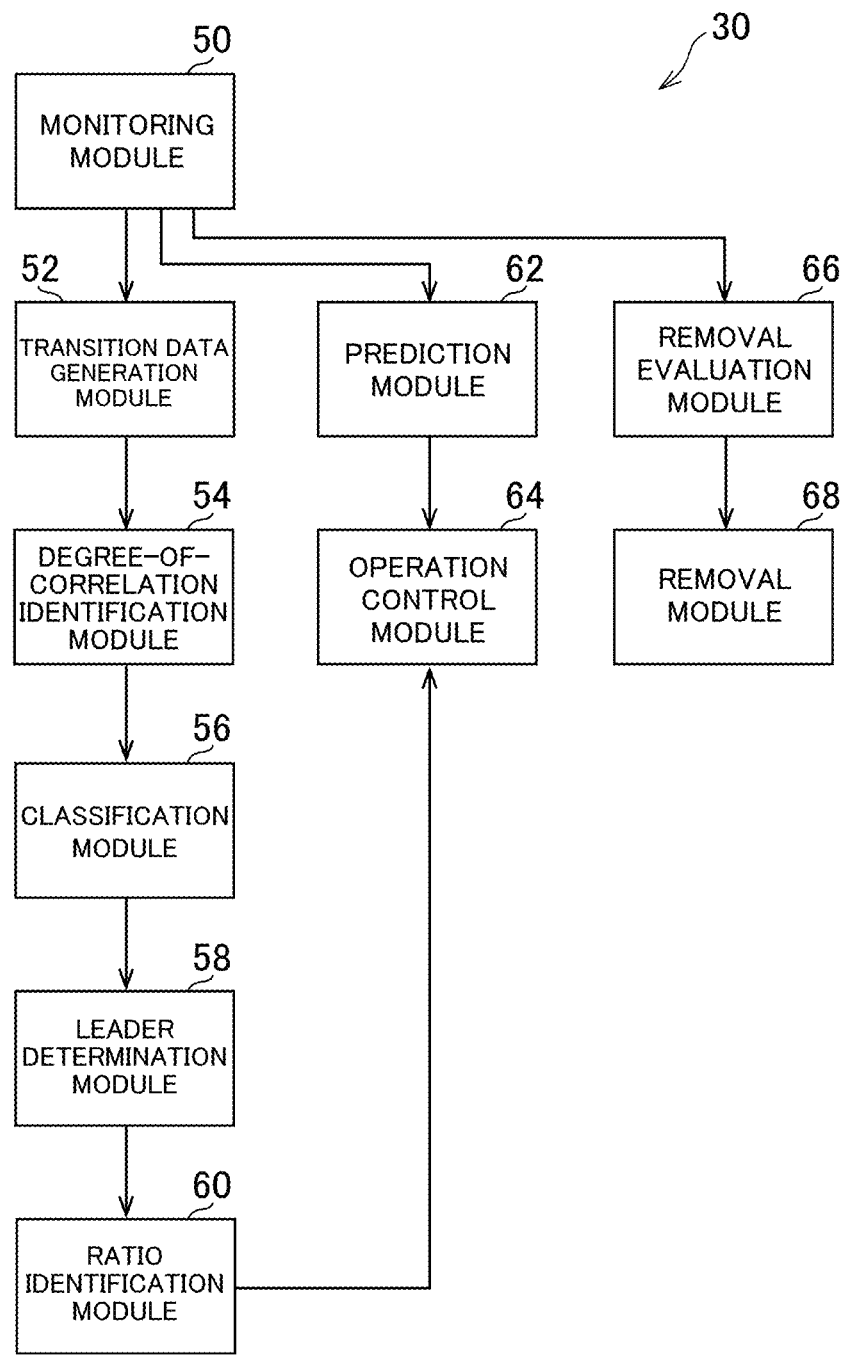
FIG. 4 is a functional block diagram for illustrating an example of functions implemented by an NOS in the one embodiment of the present invention.

FIG. 4 is a functional block diagram for illustrating an example of functions implemented by the NOS 30 in this embodiment. It is not required to implement all of the functions of FIG. 4 by the NOS 30 in this embodiment. Further, functions other than the functions of FIG. 4 may be implemented.

As illustrated in FIG. 4, the NOS 30 in this embodiment functionally includes, for example, a monitoring module 50, a transition data generation module 52, a degree-of-correlation identification module 54, a classification module 56, a leader determination module 58, a ratio identification module 60, a prediction module 62, an operation control module 64, a removal evaluation module 66, and a removal module 68.

The monitoring module 50 is mainly implemented by the communication unit 30c. The transition data generation module 52 is mainly implemented by the processor 30a and the storage unit 30b. The degree-of-correlation identification module 54, the classification module 56, the leader determination module 58, the ratio identification module 60, the prediction module 62, the removal evaluation module 66, and the removal module 68 are mainly implemented by the processor 30a. The operation control module 64 is mainly implemented by the processor 30a, the storage unit 30b, and the communication unit 30c.

The above-mentioned functions may be implemented by executing, by the NOS 30, a program that is installed in the NOS 30, which is a computer, and that includes instructions corresponding to the above-mentioned functions. Further, this program may be supplied to the NOS 30 via a computer-readable information storage medium such as an optical disc, a magnetic disk, a magnetic tape, a magneto-optical disc, or the like, or via the Internet or the like.

In this embodiment, the monitoring module 50 monitors, for example, the plurality of base station systems 40 included in the communication system 1. Then, in this monitoring, the monitoring module 50 acquires, for example, from each of the plurality of base station systems 40 included in the communication system 1, parameter data indicating values of parameters including various performance indices such as the number of accommodated persons and the traffic amount. In this embodiment, for example, the acquisition of the parameter data is repeatedly performed at predetermined time intervals.

In this case, for example, each of the base station systems 40 may successively transmit the parameter data to the NOS 30. Then, the monitoring module 50 of the NOS 30 may receive the parameter data transmitted from each base station system 40. As another example, the monitoring module 50 of the NOS 30 may successively access each of the base station systems 40, and may collect the parameter data from this base station system 40.

Figure 5:
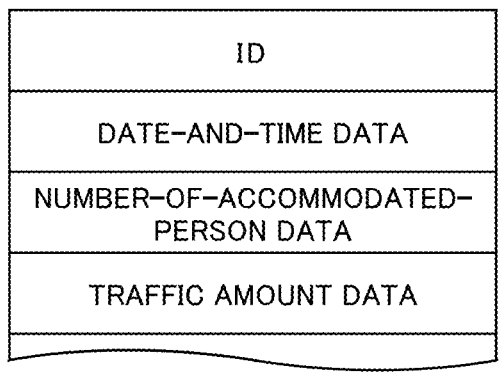
FIG. 5 is a diagram for illustrating an example of data structure of parameter data.

FIG. 5 is a diagram for illustrating an example of data structure of the parameter data acquired from the base station system 40. As illustrated in FIG. 5, the parameter data includes, for example, an ID, date-and-time data, number-of-accommodated-person data, and traffic amount data. The ID included in the parameter data is, for example, identification information on this base station system 40.

The date-and-time data is, for example, data indicating date and time when for example, the number of accommodated persons and the traffic amount in this base station system 40 are identified. The number-of-accommodated-person data is, for example, data indicating the number of accommodated persons in the area covered by this base station system 40. The traffic amount data is, for example, data indicating the traffic amount in the area covered by this base station system 40.

Then, the monitoring module 50 outputs, for example, the acquired parameter data to the transition data generation module 52. In this manner, in this embodiment, for example, the parameter data is accumulated in the transition data generation module 52.

In this embodiment, the transition data generation module 52 generates, for example, based on the collected parameter data, transition data indicating a transition of the degree of operation of each of the plurality of base station systems 40 (for example, a transition of the traffic amount or a transition of the number of accommodated persons). In this case, the transition data generation module 52 may generate, for each of the IDs different from each other, the transition data of the base station system 40 associated with this ID based on the parameter data including this ID and the date-and-time data of a predetermined time range. This transition data includes, for example, traffic amount transition data being time-series data indicating the transition of the traffic amount, and number-of-accommodated-person transition data being time-series data indicating the transition of the number of accommodated persons. In this manner, a plurality of pieces of transition data each associated with the base station system 40 are generated.

In this embodiment, the degree-of-correlation identification module 54 identifies, for example, based on the transition data, a degree of correlation of the transition of the degree of operation for each pair of base station systems 40.

In this case, the degree-of-correlation identification module 54 may calculate, for example, based on the transition data, a cross-correlation coefficient $Rxy(\tau)$ of a value indicating the degree of operation of the base station system 40. The degree-of-correlation identification module 54 may calculate, for example, the cross-correlation coefficient $Rxy(\tau)$ of the value of the above-mentioned traffic amount transition data. Further, the degree-of-correlation identification module 54 may calculate, for example, the cross-correlation coefficient $Rxy(\tau)$ of the value of the above-mentioned number-of-accommodated-person transition data. The cross-correlation coefficient $Rxy(\tau)$ is calculated for each of a plurality of lags "$\tau$".

Figure 6:
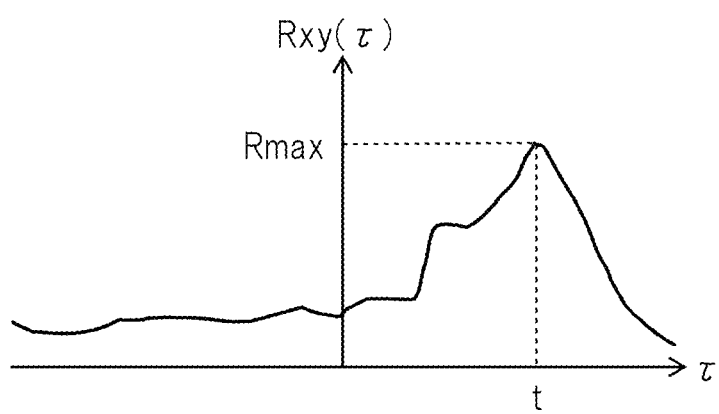
FIG. 6 is a graph for schematically showing an example of a cross-correlation coefficient.

FIG. 6 is a graph for schematically showing an example of the cross-correlation coefficient $Rxy(\tau)$ calculated for a certain pair of base station systems 40.

Further, the degree-of-correlation identification module 54 may identify a representative value of the cross-correlation coefficient of the value indicating the degree of operation as the degree of correlation of the transition of the degree of operation. Further, the degree-of-correlation identification module 54 may identify as well a value "t" of the lag "$\tau$" at the time when this representative value is taken.

In the following description, it is assumed that the degree-of-correlation identification module 54 identifies the maximum value Rmax of the cross-correlation coefficient and the value "t" of the lag "$\tau$" at the time when the value of the cross-correlation coefficient is the maximum value Rmax.

Then, the degree-of-correlation identification module 54 generates degree-of-correlation data indicating a combination between the above-mentioned value Rmax and the above-mentioned value "t", which are calculated for each pair of base station systems 40. FIG. 7 is a table for schematically showing an example of the degree-of-correlation data. FIG. 7 shows, as an example, pieces of degree-of-correlation data associated with pairs of base station systems 40 for six base station systems 40 having IDs of from 001 to 006. In the example of FIG. 7, the combination of the above-mentioned value Rmax and the above-mentioned value "t" is expressed by (Rmax, t). In the example of FIG. 7, the unit of lag "τ" is, for example, "minute."

In this embodiment, the classification module 56 classifies, for example, based on the degree of correlation identified for each pair of base station systems 40, the plurality of base station systems 40 included in the communication system 1 into the plurality of base station system groups 42. In this case, the classification module 56 may classify the plurality of base station systems 40 into the plurality of base station system groups 42 based on the representative value of the cross-correlation coefficient and the lag at the time when the cross-correlation coefficient takes the maximum value.

In this embodiment, for example, initial values for a threshold value th1 of Rmax and a range of from τ1 to τ2 of the value "t" are predetermined. Then, the classification module 56 identifies, for each base station system 40, the number of pieces of degree-of-correlation data satisfying a predetermined condition from among the pieces of degree-of-correlation data relating to combinations with other base station systems 40. In this case, for example, the number of pieces of degree-of-correlation data satisfying a condition that "the value 't' is within the range of from τ1 to τ2, and the value Rmax is equal to or larger than the threshold value th1" is identified.

Then, the classification module 56 identifies the base station system 40 having the largest number of pieces of degree-of-correlation data satisfying the above-mentioned condition as a maximum-number base station system.

Then, the classification module 56 groups the maximum-number base station system identified as described above and one or a plurality of base station systems 40 satisfying the above-mentioned condition in relation to this maximum-number base station system as the base station systems 40 included in one base station system group 42.

For example, it is assumed that the threshold value th1 is 0.7, and the range of from τ1 to τ2 is from −30 to 30.

In this case, in the example of FIG. 7, in the base station system 40 having the ID of 001, a combination with the base station system 40 having the ID of 006 satisfies the above-mentioned condition.

In the base station system 40 having the ID of 002, a combination with the base station system 40 having the ID of 004 satisfies the above-mentioned condition.

In the base station system 40 having the ID of 003, a combination with the base station system 40 having the ID of 004 satisfies the above-mentioned condition.

In the base station system 40 having the ID of 004, a combination with the base station system 40 having the ID of any one of 002, 003, and 005 satisfies the above-mentioned condition.

In the base station system 40 having the ID of 005, a combination with the base station system 40 having the ID of 004 satisfies the above-mentioned condition.

In the base station system 40 having the ID of 006, a combination with the base station system 40 having the ID of 001 satisfies the above-mentioned condition.

Thus, in this case, the base station system 40 having the ID of 004 is identified as the maximum-number base station system. Then, the base station system 40 having the ID of 002, the base station system 40 having the ID of 003, the base station system 40 having the ID of 004, and the base station system 40 having the ID of 005 are grouped as the base station systems 40 included in one base station system group 42.

In the following, a process relating to the identification of the maximum-number base station system and the grouping of the base station systems 40 is referred to as "classification process."

Further, the classification module 56 executes the above-mentioned classification process for the remaining base station systems 40. For example, the classification module 56 identifies, from among the remaining base station systems 40, the base station system 40 having the largest number of pieces of degree-of-correlation data satisfying the above-mentioned condition as the maximum-number base station system. Then, the classification module 56 classifies one or a plurality of base station systems 40 satisfying the above-mentioned condition in relation to this maximum-number base station system as the base station systems 40 included in one new base station system group 42.

In this manner, the above-mentioned classification process for the base station systems 40 that have not been included in the base station system group 42 is repeatedly executed so that the grouping of the base station systems 40 is performed.

In this embodiment, in the above-mentioned classification process, there is a possibility that a base station system 40 that is not present in any of the base station system groups 42 is present. In such a case, for example, the above-mentioned threshold value th1 may be changed to a smaller value or the above-mentioned range of from τ1 to τ2 may be widened, and then the above-mentioned classification process may be executed.

In this embodiment, the leader determination module 58 determines, for example, for each base station system group 42, the leader base station system 40a from among the plurality of base station systems 40 included in this base station system group 42. In this case, the leader determination module 58 may determine the leader base station system 40a based on the number of other base station systems 40 in each of which the degree of correlation with respect to this base station system 40 is larger than a predetermined magnitude.

The leader determination module 58 may determine, for example, the base station system 40 identified as the maximum-number base station system in the above-mentioned classification process as the leader base station system 40a in the base station system group 42 including this base station system 40. Then, the leader determination module 58 may determine each of the remaining base station systems 40 as the follower base station system 40b in the base station system group 42 including this leader base station system 40a.

In the example of FIG. 7, the base station system 40 having the ID of 004 is determined as the leader base station system 40a in this base station system group 42. Then, the base station system 40 having the ID of 002, the base station system 40 having the ID of 003, and the base station system 40 having the ID of 005 are determined as the follower base station systems 40b in this base station system group 42.

In the above-mentioned classification process, instead of using the maximum value Rmax of the cross-correlation coefficient, other representative values (for example, an average value, the minimum value, or the mean square of the cross-correlation coefficient) may be used. Further, a threshold value th1 suitable for the above-mentioned representative value may be used.

Further, the leader determination module 58 is not required to determine the leader base station system 40*a* based on the number of other base station systems 40 in each of which the degree of correlation with respect to this base station system 40 is larger than a predetermined magnitude. For example, the leader base station system 40*a* may randomly be determined from among the plurality of base station systems 40 included in the base station system group 42. Further, for example, the base station system 40 geographically closest to a center among the plurality of base station systems 40 included in the base station system group 42 may be determined as the leader base station system 40*a* in this base station system group 42.

In this embodiment, the ratio identification module 60 identifies, for example, a ratio of the degree of operation of the follower base station system 40*b* included in this base station system group 42 with respect to the degree of operation of the leader base station system 40*a* included in the base station system group 42. In this case, when the base station system group 42 includes a plurality of follower base station systems 40*b*, this ratio is identified for each of the follower base station systems 40*b*.

For example, the ratio identification module 60 may identify a ratio of the traffic amount. For example, the ratio identification module 60 may identify a ratio of a representative value of the value of the traffic amount transition data included in the above-mentioned transition data. Further, the ratio identification module 60 may identify a ratio of the number of accommodated persons. For example, the ratio identification module 60 may identify a ratio of a representative value of the value of the number-of-accommodated-person transition data included in the above-mentioned transition data. In this case, examples of the representative value used when the ratio is identified include the maximum value, the average value, the minimum value, and the mean square.

In this embodiment, the prediction module 62 predicts, for example, the degree of operation of at least one software element included in the communication system 1. The prediction module 62 predicts, for example, for each of the plurality of base station system groups 42, the traffic amount or the number of accommodated persons in the area covered by the leader base station system 40*a* included in this base station system group 42.

In this case, for example, after the plurality of base station system groups 42 included in the communication system 1 are identified as described above, the monitoring module 50 may monitor only the leader base station system 40*a*, and acquire the parameter data only from the leader base station system 40*a*. Then, the prediction module 62 may predict the degree of operation of the leader base station system 40*a*. In this manner, a monitoring load of the communication system 1 is reduced.

Then, as described above, the prediction module 62 may predict, at intervals of the predetermined unit period t1 (for example, 30 minutes), for the leader base station system 40*a*, the degree of operation in the next unit period t1 in this leader base station system 40*a*. In this case, for example, the traffic amount may be predicted. Further, the number of accommodated persons may be predicted.

In this embodiment, the operation control module 64 executes, for example, the operation control of the leader base station system 40*a* based on the degree of operation of the leader base station system 40*a* being the prediction result obtained by the prediction module 62.

Then, in this embodiment, the operation control module 64 executes, for example, for each of the plurality of base station system groups 42, the operation control corresponding to the degree of operation of the leader base station system 40*a* included in this base station system group 42, with respect to the follower base station system 40*b* included in this base station system group 42. For example, the operation control module 64 executes the operation control of the follower base station system 40*b* based on the degree of operation of the leader base station system 40*a* being the prediction result obtained by the prediction module 62 and on the ratio identified by the ratio identification module 60. In this case, this ratio refers to, as described above, the ratio of the degree of operation of this follower base station system 40*b* with respect to the degree of operation of this leader base station system 40*a*.

It is assumed that, for example, a traffic amount per unit period of the leader base station system 40*a* included in a certain base station system group 42, which is predicted by the prediction module 62, is T1. Further, it is assumed that a ratio of the degree of operation of a certain follower base station system 40*b* which is included in this base station system group 42 with respect to the degree of operation of this leader base station system 40*a*, which is identified by the ratio identification module 60, is "p".

In this case, the operation control module 64 executes, for this leader base station system 40*a*, operation control using T1 as an input value (manipulated variable). Then, the operation control module 64 executes, for this follower base station system operation control using T1×p as the input value (manipulated variable).

The operation control module 64 may transmit a control signal relating to the operation control to the base station system 40 being a target of this operation control. Then, the base station system 40 that has received this control signal may execute the operation control corresponding to this control signal.

Further, the operation control module 64 may execute, for each base station system 40, power consumption control of this base station system 40. In this case, for example, an optimal processor frequency (for example, CPU frequency) in this base station system 40 may be determined so that power saving (operation in a power saving state) suitable for the above-mentioned input value is executed. Then, the operation control module 64 may control, for each base station system 40, the CPU frequency of a CPU operating in this base station system 40 so that the determined frequency is achieved. In this case, data indicating a correspondence between the input value and the CPU frequency may be stored in the operation control module 64. Then, the operation control module 64 may execute, for the CPU included in the leader base station system 40*a*, the operation control of operating the CPU at the CPU frequency associated with the above-mentioned value T1. Further, the operation control module 64 may execute, for the CPU included in the follower base station system 40*b*, the operation control of operating the CPU at the CPU frequency associated with the above-mentioned value T1×p.

In this case, for example, data in which a range of the input value and a power state (for example, a P-state) of the processor are associated with each other in advance may be stored in the operation control module 64. Further, the operation control module 64 may control the processor included in the leader base station system 40*a* so that the processor operates in a P-state associated with the above-mentioned value T1 in this data. Further, the operation control module 64 may control the processor included in the follower base station system 40*b* so that the processor operates in a P-state associated with the above-mentioned value T1×p in this data.

Description is further given of the power consumption control of the processor executed by the operation control module 64.

Figure 8:
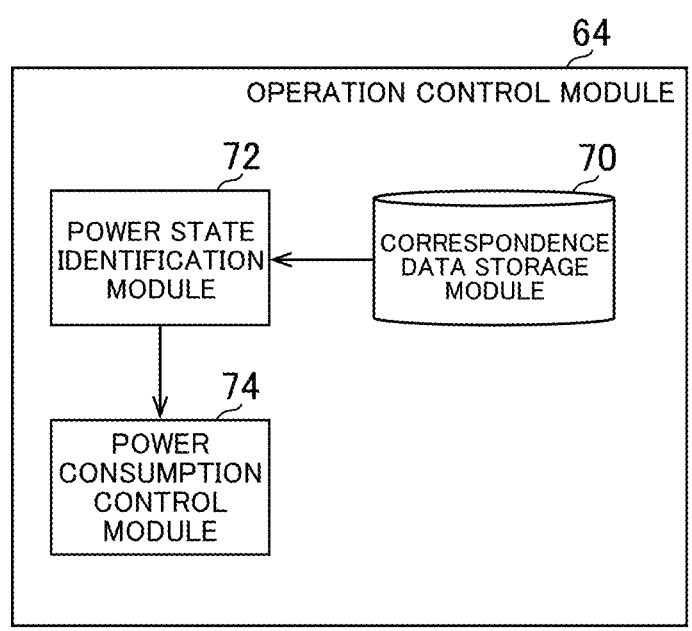
FIG. 8 is a diagram for illustrating an example of a configuration of an operation control module.

FIG. 8 is a diagram for illustrating an example of a configuration of the operation control module 64. As illustrated in FIG. 8, the operation control module 64 includes a correspondence data storage module 70, a power state identification module 72, and a power consumption control module 74. The correspondence data storage module 70 is mainly implemented by the storage unit 30*b*. The power state identification module 72 is mainly implemented by the processor 30*a*. The power consumption control module 74 is mainly implemented by the processor 30*a* and the communication unit 30*c*.

In this embodiment, the correspondence data storage module 70 stores, for example, for each of a plurality of power states into which the processor may be brought, correspondence data indicating a correspondence between a performance index value and the degree of operation relating to at least one software element included in the communication system 1. In the following description, it is assumed that this power state is a P-state.

FIG. 9 is a diagram for illustrating an example of the correspondence data. As illustrated in FIG. 9, the correspondence data includes, for example, degree-of-operation data indicating the degree of operation, and performance index value data indicating a performance index value associated with this degree of operation.

In the example of FIG. 9, the degree-of-operation data included in the correspondence data includes the traffic amount data indicating the traffic amount. Further, the performance index value data included in this correspondence data includes a plurality of combinations of P-state data, average processing time data, and average packet discard rate data. In the P-state data included in a certain combination, a P-state is indicated. In addition, in the average processing time data included in this combination, an average processing time associated with this P-state in this traffic amount is indicated. In the average packet discard rate data included in this combination, an average packet discard rate associated with this P-state in this traffic amount is indicated.

In this embodiment, for each software element such as a functional unit (NF) included in the base station system 40, for example, a DU, a CU, or the like, a load test or simulation is performed in advance in a simulated environment simulating this software element. Then, for each of the plurality of P-states, under a state in which the processor in the simulated environment is set to this P-state, a relationship between a load (traffic amount per unit period) with respect to the software element and the average processing time or the average packet discard rate is identified.

For example, the average processing time or the average packet discard rate may be measured in advance while changing the size of data input per unit period to the simulated environment. For example, the average processing time or the average packet discard rate may be measured for packets having a given data size while changing the number of packets input per unit period.

Then, the correspondence data illustrated in FIG. 9 is generated based on results of the load test or the simulation in the simulated environment as described above.

In this embodiment, the above-mentioned average processing time refers to, for example, an average value of times from when the simulated environment of the software element receives packets having a given data size to when the execution of the process in this software element is ended. Further, the above-mentioned average packet discard rate refers to, for example, a rate of the number of discarded packets with respect to the number of packets received by the simulated environment of the software element.

Further, the correspondence data may be created based on, for example, a heuristic in an actual environment instead of the results of the load test or the simulation.

In this embodiment, for example, a plurality of pieces of correspondence data associated with traffic amounts different from each other, which are associated with types of the software element, are stored in the correspondence data storage module 70. In the following, the plurality of pieces of correspondence data associated with the traffic amounts different from each other, which are associated with the types of the software element, are referred to as "correspondence data set."

In this embodiment, the power state identification module 72 identifies, for example, based on the correspondence data, any of the power states for reaching a given target relating to the performance index value in the degree of operation being the prediction result obtained by the prediction module 62. In this case, for example, the power state identification module 72 may identify a power state having the lowest power consumption among the power states for reaching the given target relating to the performance index value in the degree of operation being the prediction result obtained by the prediction module 62. In the following, the power state identified as described above is referred to as "target power state."

In this case, for example, the power state identification module 72 may calculate, based on the traffic amount T1 per unit period predicted for the leader base station system 40*a*, a traffic amount T2 per unit period per one DU included in this leader base station system 40*a*. For example, when the number of DUs included in the leader base station system 40*a* is three, a value T1/3 may be calculated as the value T2.

Then, the power state identification module 72 may identify the correspondence data including the traffic amount data having the value of T2 from among the plurality of pieces of correspondence data included in the correspondence data set associated with the DU. Then, the power state identification module 72 may identify, based on the identified correspondence data, P-states in which the value of the corresponding average processing time data is equal to or smaller than a given target value. Then, the power state identification module 72 may identify a P-state having the lowest power consumption among those P-states as a target P-state.

As another example, the power state identification module 72 may identify, based on the identified correspondence data, P-states in which a value of the corresponding average packet discard rate data is equal to or smaller than a given target value. Then, the power state identification module 72 may identify a P-state having the lowest power consumption among those P-states as a target P-state.

The power consumption becomes larger as the P-state becomes higher. For example, a state in which the P-state is P6 has the highest power consumption, and thereafter the power consumption is decreased in order of P5, P4, P3, P2, and P1.

Figure 10:
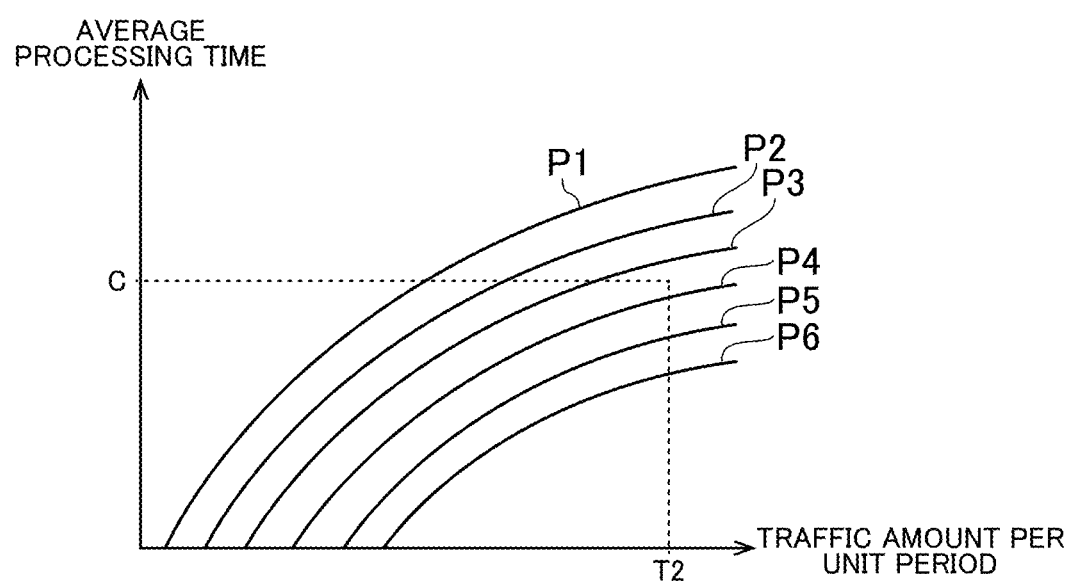
FIG. 10 is a graph for schematically showing an example of a relationship between a traffic amount per unit period and an average processing time.
Figure 11:
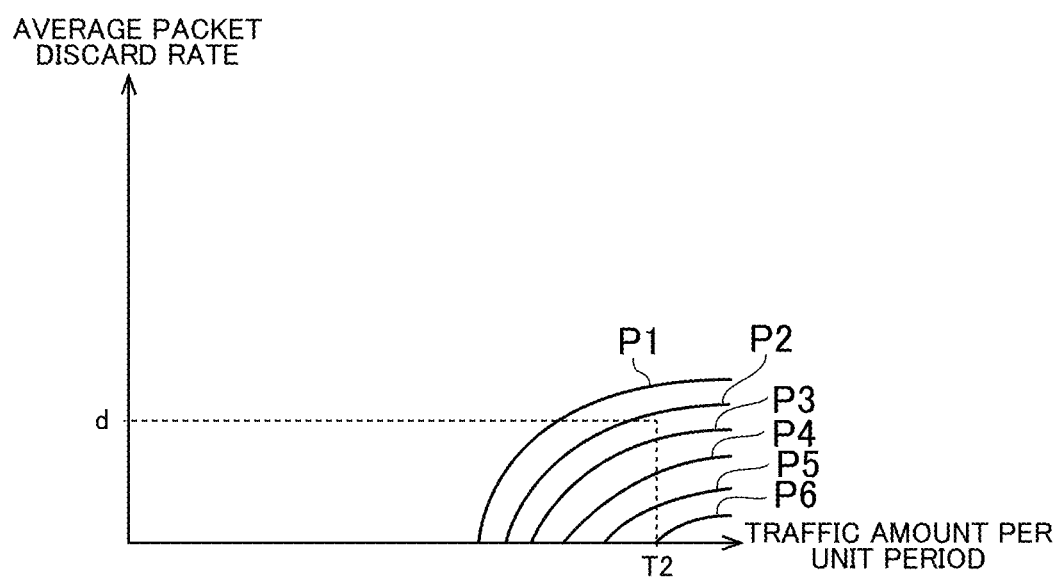
FIG. 11 is a graph for schematically showing an example of a relationship between the traffic amount per unit period and an average packet discard rate.

FIG. 10 is a graph for schematically showing an example of a relationship between the traffic amount per unit period (for example, 30 minutes) and the average processing time for each of the plurality of P-states (P1 to P6). FIG. 11 is a graph for schematically showing an example of a relationship between the traffic amount per unit period (for example, 30 minutes) and the average packet discard rate for each of the plurality of P-states (P1 to P6).

As shown in FIG. 10, when the traffic amount per unit period is fixed, the average processing time becomes shorter as the P-state becomes higher. Further, as shown in FIG. 11, when the traffic amount per unit period is fixed, the average packet discard rate becomes lower as the P-state becomes higher.

For example, it is assumed that, based on the correspondence data, as shown in FIG. 10, in the traffic amount T2 per unit period, P4 to P6 are identified as the P-states in which the value of the average processing time data is equal to or smaller than a given target value "c". In this case, from among those P-states, P4 being the P-state having the lowest power consumption may be identified as the target P-state.

Further, it is assumed that, based on the correspondence data, as shown in FIG. 11, in the traffic amount T2 per unit period, P3 to P6 are identified as the P-states in which the value of the average packet discard rate data is equal to or smaller than a given target value "d". In this case, from among those P-states, P3 being the P-state having the lowest power consumption may be identified as the target P-state.

In this embodiment, the power consumption control module 74 operates, for example, a processor for executing at least one software element in the identified power state. For example, in the above-mentioned case, the processor for executing the software element of the DU included in this leader base station system 40a may be operated in the target P-state identified as described above.

Further, in this embodiment, the power state identification module 72 may identify, based on the correspondence data, the power state having the lowest power consumption as a first state among the power states for reaching the given target relating to the average processing time in the degree of operation being the prediction result.

Then, the power state identification module 72 may identify, based on the correspondence data, the power state having the lowest power consumption as a second state among the power states for reaching the given target relating to the average packet discard rate in the degree of operation being the prediction result.

In the above-mentioned case, P4 corresponds to the first state, and P3 corresponds to the second state. In this case, the target relating to the average processing time cannot be reached in P3 being the second state, but both of the target relating to the average processing time and the target relating to the average packet discard rate can be reached in P4 being the first state.

In view of the above, the power consumption control module 74 may operate the processor for executing the at least one software element in one of the first state or the second state being the power state having higher power consumption. For example, in the above-mentioned case, the processor for executing the software element of the DU included in the leader base station system 40a may be operated in P4 being the first state. In this manner, when there are a plurality of targets, all of those targets can be reached.

When a priority is given to suppression of power consumption than reaching of the target, the power consumption control module 74 may operate the processor for executing the at least one software element in one of the first state or the second state being the power state having lower power consumption.

Further, the above-mentioned power consumption control is also applicable to the follower base station system 40b.

For example, the power state identification module 72 may calculate, based on the traffic amount T1 per unit period predicted for the leader base station system 40a, and on the above-mentioned ratio "p" relating to this follower base station system 40b, a traffic amount T3 per unit period per one DU. For example, when the number of DUs included in this follower base station system 40b is three, a value T1×p/3 may be calculated as the value T3.

Then, the processor for executing the software element of the DU included in this follower base station system 40b may be operated in the target P-state identified based on the value T3 as described above.

Further, the power state identification module 72 may identify, based on the correspondence data, for each P-state, a range of the traffic amount per unit period associated with this P-state. Then, the power state identification module 72 may identify a P-state associated with the range in which the traffic amount T2 per unit period is included as the target P-state.

Further, as the above-mentioned degree of operation, instead of using the traffic amount in the area covered by the at least one software element per unit period, the number of accommodated persons in the area covered by the at least one software element may be used.

Further, the above-mentioned power consumption control is also applicable to an NF (CU or the like) other than the DU. Further, the above-mentioned power consumption control is also applicable to a software element included in the core network system 34, for example, a UPF or the like, without being limited to the base station system 40.

Further, the correspondence data is not required to be associated with the type of the software element, and may be associated with the entire base station system 40. Then, the processor for executing the software element included in the base station system 40 may be operated in the power state determined based on the degree of operation predicted for this base station system 40 and the correspondence data associated with this base station system 40.

Further, the operation control in this embodiment is not limited to the power consumption control. For example, in this embodiment, control of a capacity such as the number of accommodated persons allocated to a network slice and control of a resource amount allocated to a network slice may be performed.

Further, in this embodiment, even after the plurality of base station system groups 42 included in the communication system 1 are identified, the monitoring of the follower base station system 40b may be performed.

In this embodiment, the removal evaluation module 66 evaluates, for example, a magnitude of a deviation of a ratio of the degree of operation of the follower base station system 40b included in the base station system group 42 with respect to the degree of operation of the leader base station system 40a included in this base station system group 42 from a given reference ratio.

In this embodiment, the removal module 68 removes, for example, in accordance with the fact that the above-mentioned magnitude of the deviation has satisfied a predetermined condition, the follower base station system 40b satisfying the condition from the base station system group 42 including this follower base station system 40b.

In this case, the removal evaluation module 66 may identify, for each of the follower base station systems 40b, a removal evaluation value being a value associated with the above-mentioned magnitude of the deviation. Then, the removal module 68 may remove the follower base station system 40b in which the identified removal evaluation value satisfies a predetermined condition from the base station system group 42 including this follower base station system 40b.

In this embodiment, for example, every time a predetermined removal determination timing (for example, a timing of once in several months) is reached, the monitoring module 50 may acquire pieces of parameter data from all of the base station systems 40 over a predetermined time period. In this case, a monitoring interval for the leader base station system 40a being a target of prediction of the degree of operation performed by the prediction module 62 and a monitoring interval for all of the base station systems 40 at the removal determination timing may be different from each other. For example, the parameter data may be collected at intervals of 100 milliseconds for the leader base station system 40a, and the parameter data may be collected at intervals of 3 seconds for the follower base station system 40b.

In addition, the removal evaluation module 66 may identify, for each of a plurality of dates and times, the degree of operation of each base station system 40 at this date and time.

FIG. 12 is a table for schematically showing an example of degrees of operation identified for a certain base station system group 42 including six base station systems 40. In the example of FIG. 12, the IDs of those six base station systems 40 are 101, 102, 103, 104, 105, and 106, respectively. Further, it is assumed that the base station system 40 having the ID of 101 is the leader base station system 40a in this base station system group 42.

In this case, it is assumed that the ratios of the degrees of operation of the follower base station systems 40b having the IDs of 102, 103, 104, 105, and 106 with respect to the degree of operation of the leader base station system 40a having the ID of 101, which are identified by the ratio identification module 60, are p12, p13, p14, p15, and p16, respectively. In the following description, each of those ratios is referred to as "reference ratio."

In addition, FIG. 12 shows, for each of three dates and times (0:00:00, 0:00:03, and 0:00:06), the degree of operation (for example, the value of the number-of-accommodated-person data or the value of the traffic amount data) indicated by the parameter data including the date-and-time data indicating this date and time.

For example, it is assumed that the degrees of operation of the base station systems 40 having the IDs of 101, 102, 103, 104, 105, and 106 at the date and time "0:00:00" are T11, T12, T13, T14, T15, and T16, respectively.

In addition, in this embodiment, the removal evaluation module 66 may calculate, for the follower base station system a normalized degree of operation being a value obtained by dividing the degree of operation by the above-mentioned reference ratio. In the example of FIG. 12, the normalized degrees of operation of the base station systems 40 having the IDs of 102, 103, 104, 105, and 106 at the date and time "0:00:00" are represented by T12', T13', T14', T15', and T16', respectively. As shown in FIG. 12, T12', T13', T14', T15', and T16' are a value obtained by dividing T12 by p12, a value obtained by dividing T13 by p13, a value obtained by dividing T14 by p14, a value obtained by dividing T15 by p15, and a value obtained by dividing T16 by p16, respectively.

Further, it is assumed that the degrees of operation of the base station systems 40 having the IDs of 101, 102, 103, 104, 105, and 106 at the date and time "0:00:03" are T21, T22, T23, T24, T25, and T26, respectively. In this case, a value obtained by dividing T22 by p12 may be identified as a normalized degree of operation T22' of the base station system 40 having the ID of 102. Further, a value obtained by dividing T23 by p13 may be identified as a normalized degree of operation T23' of the base station system 40 having the ID of 103. Further, a value obtained by dividing T24 by p14 may be identified as a normalized degree of operation T24' of the base station system 40 having the ID of 104. Further, a value obtained by dividing T25 by p15 may be identified as a normalized degree of operation T25' of the base station system 40 having the ID of 105. Further, a value obtained by dividing T26 by p16 may be identified as a normalized degree of operation T26' of the base station system having the ID of 106.

Further, it is assumed that the degrees of operation of the base station systems 40 having the IDs of 101, 102, 103, 104, 105, and 106 at the date and time "0:00:06" are T31, T32, T33, T34, T35, and T36, respectively. In this case, a value obtained by dividing T32 by p12 may be identified as a normalized degree of operation T32' of the base station system 40 having the ID of 102. Further, a value obtained by dividing T33 by p13 may be identified as a normalized degree of operation T33' of the base station system 40 having the ID of 103. Further, a value obtained by dividing T34 by p14 may be identified as a normalized degree of operation T34' of the base station system 40 having the ID of 104. Further, a value obtained by dividing T35 by p15 may be identified as a normalized degree of operation T35' of the base station system 40 having the ID of 105. Further, a value obtained by dividing T36 by p16 may be identified as a normalized degree of operation T36' of the base station system having the ID of 106.

In addition, in this embodiment, also for the dates and times after the date and time "0:00:06," the degree of operation is similarly identified for each of the base station systems 40.

In addition, the removal evaluation module 66 identifies, for each of the plurality of dates and times, the removal evaluation value for each follower base station system 40b.

In this case, for example, a difference D between the normalized degree of operation of the follower base station system 40b and the degree of operation of the leader base station system 40a may be identified. A magnitude of the difference D identified in this manner is associated with the magnitude of the deviation of the ratio of the degree of operation of this follower base station system 40b with respect to the degree of operation of the leader base station system 40a from the given reference ratio. In the example of FIG. 12, for the date and time "0:00:00," values of T12'-T11, T13'-T11, T14'-T11, T15'-T11, and T16'-T11 may be identified. In the following, the values of T12'-T11, 113'-T11, T14'-T11, T15'-T11, and T16'-T11 are expressed as D12, D13, D14, D15, and D16, respectively.

Further, similarly, for the date and time "0:00:03," values of T22'-T21, T23'-T21, T24'-T21, T25'-T21, and T26'-T21 may be identified. In the following, the values of T22'-T21, T23'-T21, T24'-T21, T25'-T21, and T26'-T21 are expressed as D22, D23, D24, D25, and D26, respectively.

Further, similarly, for the date and time "0:00:06," values of T32'-T31, T33'-T31, T34'-T31, T35'-T31, and T36'-T31 may be identified. In the following, the values of T32'-T31, T33'-T31, T34'-T31, T35'-T31, and T36'-T31 are expressed as D32, D33, D34, D35, and D36, respectively.

Also for the dates and times after the date and time "0:00:06," the difference D between the normalized degree of operation of the follower base station system 40b and the degree of operation of the leader base station system 40a is similarly identified.

In addition, in accordance with the fact that the magnitude of the difference D between a value indicating the degree of operation of the leader base station system 40a included in the base station system group 42 and a value obtained by dividing a value indicating the degree of operation of the follower base station system 40b included in this base station system group 42 by the reference ratio has satisfied a predetermined condition, the removal module 68 may remove this follower base station system 40b from this base station system group 42.

In this case, for example, the removal evaluation module 66 may calculate, for each follower base station system 40b, the removal evaluation value for this follower base station system 40b based on the value of the difference D identified for each of the plurality of dates and times as described above. Then, the removal module 68 may remove the follower base station system 40b in which the calculated removal evaluation value satisfies a predetermined condition from the base station system group 42 including this follower base station system 40b.

For example, the removal evaluation module 66 may calculate an average of the differences D identified a plurality of times for the follower base station system 40b as the removal evaluation value of this follower base station system 40b. For example, for the follower base station system 40b, an average of the differences D identified for the above-mentioned plurality of dates and times may be calculated as the removal evaluation value of this follower base station system 40b. Then, the removal module 68 may remove the follower base station system 40b in which the calculated average satisfies a predetermined condition from the base station system group 42 including this follower base station system 40b. For example, when an absolute value of the calculated average or a square of the average value is larger than a predetermined value, this follower base station system 40b may be removed from the base station system group 42 including this follower base station system 40b.

Further, the removal evaluation module 66 may calculate a variance or a standard deviation of the differences D identified a plurality of times for the follower base station system 40b as the removal evaluation value of this follower base station system 40b. For example, for the follower base station system 40b, a variance or a standard deviation of the differences D identified for the above-mentioned plurality of dates and times may be calculated as the removal evaluation value of this follower base station system 40b. Then, the removal module 68 may remove the follower base station system 40b in which the magnitude of the calculated variance or standard deviation satisfies a predetermined condition (for example, is larger than a predetermined value) from the base station system group 42 including this follower base station system 40b.

Further, the follower base station system 40b satisfying at least one of a condition that the absolute value of the average value or the square of the average value is larger than the predetermined value or a condition that the variance or the standard deviation is larger than the predetermined value may be removed from the base station system group 42 including this follower base station system 40b.

Further, the removal evaluation module 66 may generate statistical data obtained by aggregating values of the differences D identified for a plurality of dates and times for all of the follower base station systems 40b. In the following, data corresponding to the value of the difference D, which is included in the statistical data generated as described above, is referred to as "sample." Then, the removal evaluation module 66 may identify the standard deviation of the samples aggregated for all of the follower base station systems 40b as described above. Then, the removal evaluation module 66 may identify, for each of the follower base station systems 40b, the number of samples each having a larger absolute value than a predetermined multiple (for example, a double or a triple) of the identified standard deviation as the removal evaluation value of this follower base station system 40b.

As another example, the removal evaluation module 66 may identify the number of samples not being included in a predetermined confidence interval (for example, a 95% confidence interval or a 99% confidence interval) as the removal evaluation value of this follower base station system 40b.

Then, the removal module 68 may remove the follower base station system 40b in which the identified number of samples is larger than a predetermined number from the base station system group 42 including this follower base station system 40b.

As another example, the removal module 68 may remove the follower base station system 40b in which a proportion of the identified number of samples with respect to the total number of samples for this follower base station system 40b is larger than a predetermined proportion from the base station system group 42 including this follower base station system 40b.

Further, the removal module 68 may remove the follower base station system 40b satisfying a condition that a distribution of the differences D identified a plurality of times is different from those of other follower base station systems 40b from this base station system group 42. For example, the removal module 68 may remove the follower base station system 40b having the largest number of samples each identified as the above-mentioned removal evaluation value from the base station system group 42 including this follower base station system 40b.

Further, the removal evaluation module 66 may generate, as the above-mentioned statistical data, a histogram in which a section is set for each range of the value of the difference D determined in advance, and which indicates the number (frequency value) of differences D of each follower base station system 40b included in this section. Then, the removal evaluation module 66 may identify the removal evaluation value described above based on the generated histogram. For example, the removal evaluation module 66 may identify, for each follower base station system 40b, a ratio of the number of samples included in each of the sections outside of the confidence interval in the generated histogram as the removal evaluation value. Then, the removal module 68 may remove the follower base station system 40b in which the identified ratio is significantly different from those of other follower base station systems 40b from the base station system group 42 including this follower base station system 40b.

Further, the removal evaluation module 66 may determine, for each of the plurality of dates and times, whether or not the value of the above-mentioned difference D of each follower base station system 40b satisfies a predetermined condition. For example, it may be determined whether or not a condition that the absolute value of the above-mentioned difference D or the square of the value of the above-mentioned difference D is larger than a predetermined value is satisfied. Then, the removal module 68 may remove the follower base station system 40*b* satisfying a condition that, in the determination related to the plurality of dates and times, the number of times of satisfying this condition is equal to or larger than a predetermined number of times from the base station system group 42 including this follower base station system 40*b*.

Further, in this embodiment, a difference between a value obtained by multiplying a value indicating the degree of operation of the leader base station system 40*a* included in the base station system group 42 by the reference ratio and a value indicating the degree of operation of the follower base station system 40*b* included in this base station system group 42 may be used as the above-mentioned difference D. In addition, the removal module 68 may remove this follower base station system 40*b* from the base station system group 42 including this follower base station system 40*b* in accordance with the fact that the magnitude of the difference D has satisfied the predetermined condition. The magnitude of the difference D identified in this manner is associated with the magnitude of the deviation of the ratio of the degree of operation of this follower base station system 40*b* with respect to the degree of operation of the leader base station system 40*a* from the given reference ratio.

In the following, the base station system 40 removed from the base station system group 42 as described above is referred to as "removed base station system."

For example, the removed base station system may be set so as not to be included in any of the base station system groups 42. In addition, for this removed base station system, operation control similar to that for the leader base station system 40*a* described above may be executed.

Further, for example, the removed base station system may be included in another base station system group 42. For example, the monitoring module 50 may acquire parameter data over a predetermined time period for the removed base station system. Then, the transition data generation module 52 may generate transition data of the removed base station system based on the parameter data acquired as described above.

Then, the degree-of-correlation identification module 54 may identify, based on the transition data, the degree of correlation of the transition of the degree of operation between the leader base station system 40*a* of each base station system group 42 and the removed base station system. Then, this removed base station system may be included as the follower base station system 40*b* in the base station system group 42 including the leader base station system 40*a* having the largest degree of correlation.

As another example, in accordance with the determination on the removal of the base station system 40 from the base station system group 42, the classification module 56 may reclassify all of the base station systems 40 included in the communication system 1.

As used herein, "reclassification" refers to, for example, as described above, a process of identifying, by the degree-of-correlation identification module 54, the degree of correlation of the transition of the degree of operation between a pair of base station systems 40 again, a process of classifying, based on the identified degree of correlation, the plurality of base station systems 40 included in the communication system 1 into the plurality of base station system groups 42 again, and the like.

In this embodiment, in some cases, a tendency of a transition of the degree of operation of a specific follower base station system 40*b* changes for some reasons such as an increase of the number of subscribers in a specific area, for example.

Such a follower base station system 40*b* is brought into a state in which the operation control corresponding to the degree of operation of the leader base station system 40*a* cannot be accurately performed. Thus, this follower base station system should no longer be included in this base station system group 42 including this follower base station system 40*b*.

In view of the above, in this embodiment, as described above, in accordance with the fact that the magnitude of the deviation of the ratio of the degree of operation of the follower base station system 40*b* with respect to the degree of operation of the leader base station system 40*a* from the given reference ratio has satisfied the predetermined condition, this follower base station system 40*b* is removed from the base station system group 42 including this follower base station system 40*b*.

In this manner, according to this embodiment, the follower base station system 40*b* which should not be included in the base station system group 42 can be accurately removed from this base station system group 42.

Figure 13:
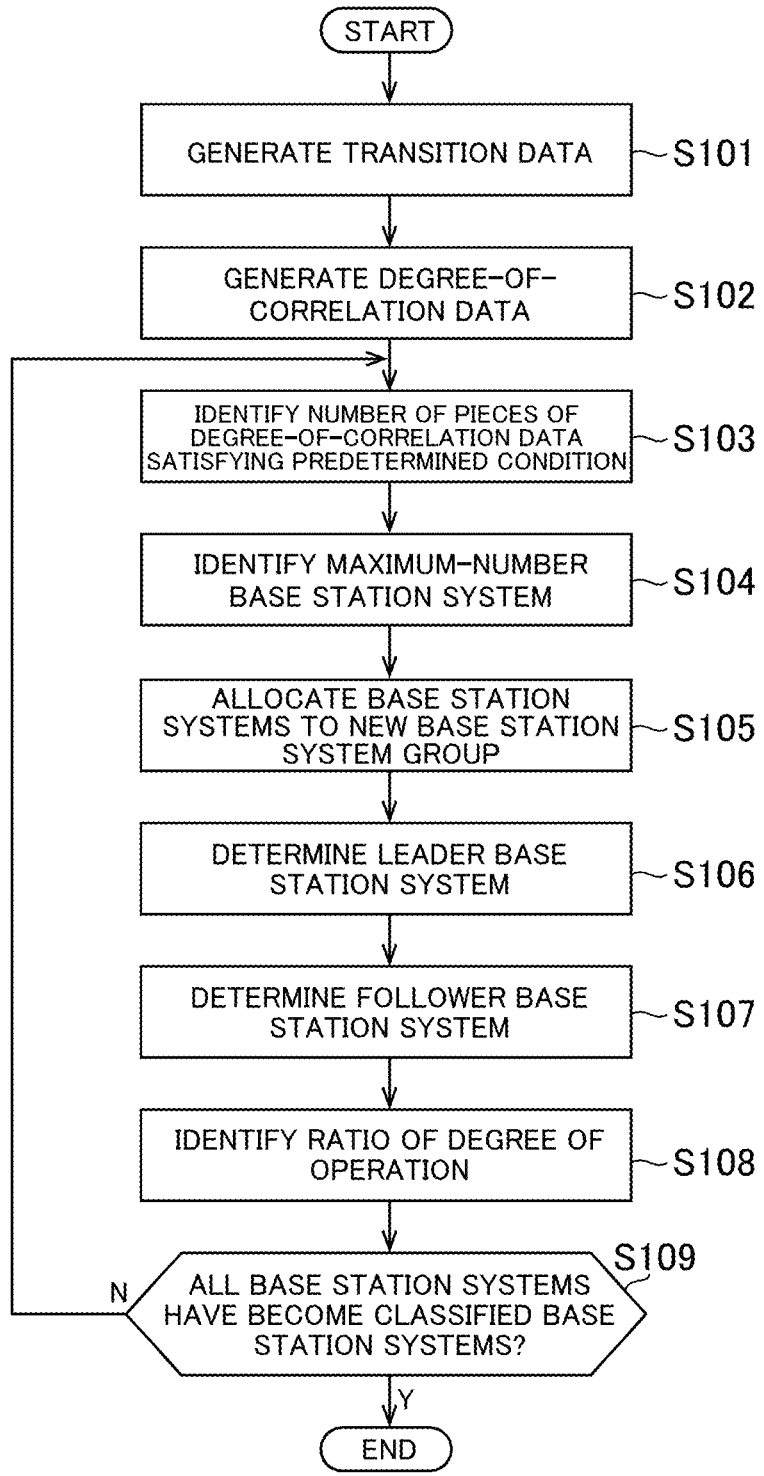
FIG. 13 is a flow chart for illustrating an example of a flow of a process executed by the NOS in the one embodiment of the present invention.

Description is now given of an example of a flow of a process relating to grouping of the base station systems 40 executed by the NOS 30 in this embodiment, with reference to the flow chart exemplified in FIG. 13.

In this process example, it is assumed that, with the monitoring performed by the monitoring module 50, the parameter data is acquired for the plurality of base station systems 40 included in the communication system 1, and the parameter data is accumulated in the transition data generation module 52.

Further, in this process example, the base station system 40 classified into any of the base station system groups 42 is referred to as "classified base station system," and the base station system 40 not classified into any of the base station system groups 42 is referred to as "unclassified base station system." In the initial state, all of the base station systems 40 are unclassified base station systems.

First, the transition data generation module 52 generates transition data for a predetermined time range, for each of the plurality of unclassified base station systems (Step S101).

Then, the degree-of-correlation identification module 54 generates, based on the transition data generated in the process step of Step S101, for each pair of base station systems 40, degree-of-correlation data associated with this pair (Step S102).

Then, the classification module 56 identifies, for each of the plurality of unclassified base station systems, the number of pieces of degree-of-correlation data satisfying the above-mentioned predetermined condition among the pieces of degree-of-correlation data relating to combinations with other unclassified base station systems (Step S103).

Then, the classification module 56 identifies the unclassified base station system having the largest number identified in the process step of Step S103 as the maximum-number base station system (Step S104).

Then, the classification module 56 allocates, to a new base station system group 42, the maximum-number base station system identified in the process step of Step S104 and one or a plurality of unclassified base station systems satisfying the above-mentioned predetermined condition in relation to this maximum-number base station system (Step S105). The unclassified base station systems allocated to the new base station system group 42 as described above become classified base station systems.

Then, the leader determination module 58 determines the maximum-number base station system identified in the process step of Step S104 as the leader base station system 40*a* in the base station system group 42 to which the unclassified base station systems have been allocated in the process step of Step S105 (Step S106).

Then, the leader determination module 58 determines the remaining base station systems 40 allocated to the base station system group 42 in the process step of Step S105 as the follower base station systems 40*b* in this base station system group 42 (Step S107).

Then, the ratio identification module 60 identifies, for each of the follower base station systems 40*b* determined in the process step of Step S107, the ratio "p" of the degree of operation of this follower base station system 40*b* with respect to the degree of operation of the leader base station system 40*a* determined in the process step of Step S106 (Step S108).

Then, the classification module 56 confirms whether or not all of the base station systems 40 have become the classified base station systems (Step S109).

When all of the base station systems 40 have not become the classified base station systems (Step S109: N), the process returns to the process step of Step S103. At this time, the process step of Step S103 may be executed after the predetermined condition in the process step of Step S103 is changed.

When it is confirmed that all of the base station systems have become the classified base station systems in the process step of Step S109 (Step S109: Y), the process illustrated in this process example is ended.

Figure 14:
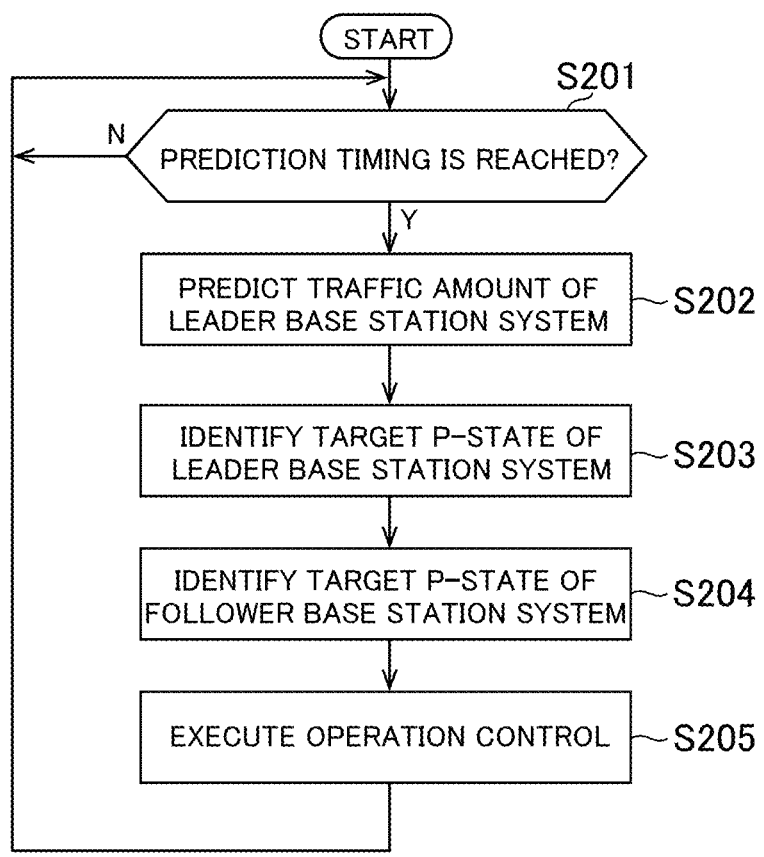
FIG. 14 is a flow chart for illustrating an example of a flow of a process executed by the NOS in the one embodiment of the present invention.

Next, description is given of an example of a flow of a process relating to the operation control of the base station system 40 executed by the NOS 30 in this embodiment, with reference to the flow chart exemplified in FIG. 14. In this process example, it is assumed that the correspondence data is stored in advance in the correspondence data storage module 70.

For example, the process steps of from Step S201 to Step S205 are independently executed for each of the plurality of base station system groups 42.

First, the prediction module 62 waits until a prediction timing that occurs at the intervals of the predetermined unit period t1 is reached (Step S201).

When the prediction timing is reached, the prediction module 62 predicts, based on the parameter data of the leader base station system 40*a* of this base station system group 42, which has been acquired in the latest unit period t1, the traffic amount T1 of this leader base station system 40*a* in the next unit period t1 (Step S202).

Then, the power state identification module 72 identifies the target P-state of this leader base station system 40*a* (Step S203). In the process step of Step S203, for example, the target P-state of this leader base station system 40*a* is identified based on the traffic amount T1 identified in the process step of Step S202.

Then, the power state identification module 72 identifies the target P-state for each of the one or the plurality of follower base station systems 40*b* included in this base station system group 42 (Step S204). In the process step of Step S204, for example, for each of the one or the plurality of follower base station systems 40*b*, the target P-state of this follower base station system 40*b* is identified based on the traffic amount T1 identified in the process step of Step S202 and the ratio "p" identified in the process step of Step S108 for this follower base station system 40*b*.

Then, the power consumption control module 74 executes the operation control for each of the base station systems 40 included in this base station system group 42 (Step S205), and the process returns to the process step of Step S201. In the process step of Step S205, for example, the leader base station system 40*a* is controlled so that the CPU of the server included in this leader base station system 40*a* is operated in the target P-state identified in the process step of Step S203. Further, the follower base station system 40*b* is controlled so that the CPU of the server included in this follower base station system 40*b* is operated in the target P-state identified for this follower base station system 40*b* in the process step of Step S204.

Figure 15:
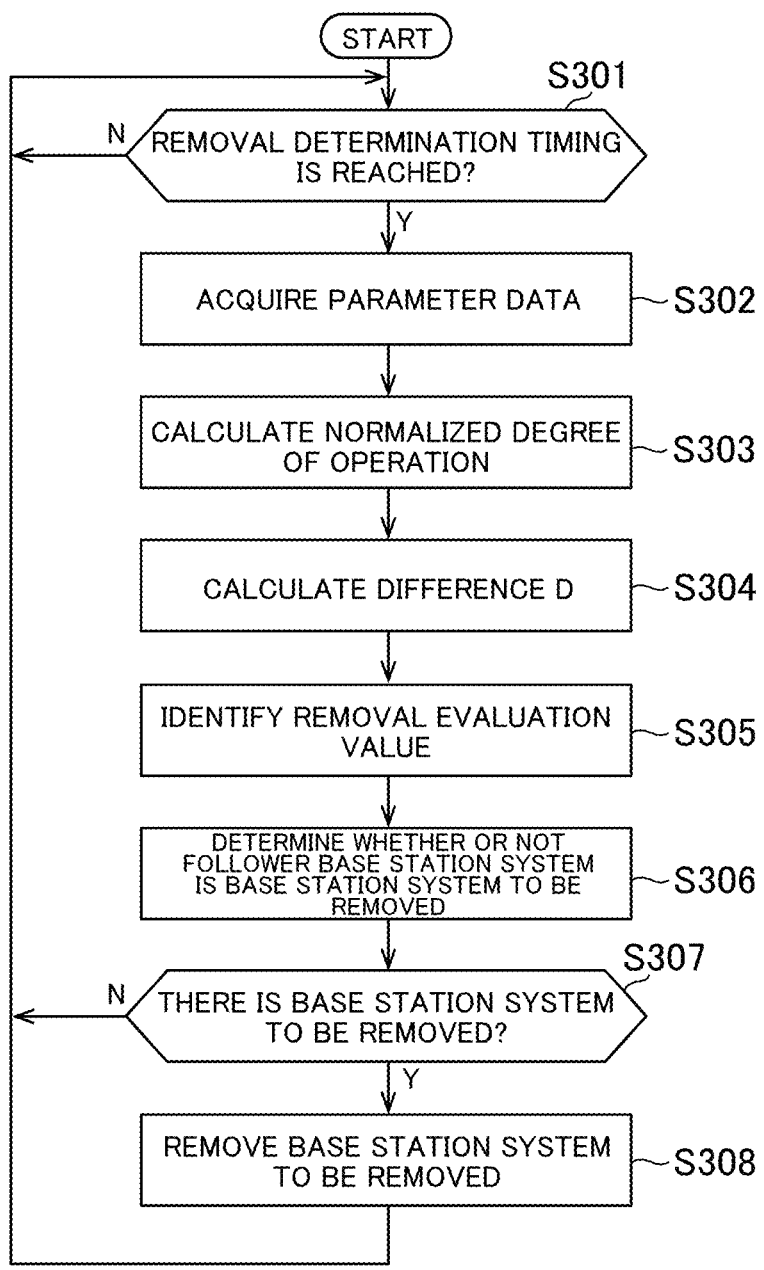
FIG. 15 is a flow chart for illustrating an example of a flow of a process executed by the NOS in the one embodiment of the present invention.

Next, description is given of an example of a flow of a process relating to removal of the base station systems 40 executed by the NOS 30 in this embodiment, with reference to the flow chart exemplified in FIG. 15.

For example, the process steps of from Step S301 to Step S308 are independently executed for each of the plurality of base station system groups 42.

In this process example, the removal evaluation module 66 monitors whether the predetermined removal determination timing (for example, a timing of once in several months) is reached (Step S301).

When the removal determination timing is reached, the monitoring module 50 acquires pieces of parameter data from all of the base station systems 40 included in this base station system group 42 over a predetermined time period (Step S302).

Then, the removal evaluation module 66 calculates, for each of the plurality of dates and times included in this predetermined time period, the normalized degree of operation of each of the plurality of follower base station systems 40*b* included in this base station system group 42 (Step S303). In this case, for example, for each follower base station system 40*b*, the normalized degree of operation of this follower base station system 40*b* is calculated based on the degree of operation indicated by the parameter data of the follower base station system 40*b* and the reference ratio (for example, the ratio "p" identified in the process step of Step S108) of this follower base station system 40*b*.

Then, the removal evaluation module 66 calculates, for the each of the plurality of dates and times, the difference D for each of the plurality of follower base station systems 40*b* included in this base station system group 42 (Step S304). In this case, for example, for each follower base station system 40*b*, the difference D between the degree of operation of the leader base station system 40*a* and the normalized degree of operation of the follower base station system 40*b* calculated in the process step of Step S303 is calculated as the difference D in this follower base station system 40*b*.

Then, the removal evaluation module 66 identifies the removal evaluation value for each of the plurality of follower base station systems 40*b* included in this base station system group 42 (Step S305). In this case, for example, for each follower base station system 40*b*, the removal evaluation value of this follower base station system 40*b* is calculated based on the difference D in the follower base station system 40*b* identified for each of the plurality of dates and times in the process step of Step S304.

Then, the removal module 68 determines, for each of the plurality of follower base station systems 40*b*, whether or not this follower base station system 40*b* is a base station system to be removed based on the removal evaluation value generated in the process step of Step S305 (Step S306).

Then, the removal module 68 confirms whether or not there is a follower base station system 40b determined as the base station system to be removed in the process step of Step S306 (Step S307).

When there is no follower base station system 40b determined as the base station system to be removed (Step S307: N), the process returns to the process step of Step S301.

When there is a follower base station system 40b determined as the base station system to be removed (Step S307: Y), the removal module 68 removes the base station system to be removed from this base station system group 42 (Step S308), and the process returns to the process step of Step S301.

In this embodiment, only the leader base station system 40a included in the base station system group 42 is a prediction target of the degree of operation, and the degree of operation is not predicted for the follower base station system 40b. In this manner, according to this embodiment, the processing load of the communication system 1 can be reduced.

Further, in this embodiment, the power consumption control is performed by controlling the power state such as the P-state. Thus, according to this embodiment, while the communication performance is ensured, power consumption control having high readiness with respect to the change in degree of operation can be performed.

It should be noted that the present invention is not limited to the above-mentioned embodiment.

The invention claimed is:

1. A control system, comprising:
   at least one processor; and
   at least one memory device storing instructions which, when executed by the least one processor, cause the at least one processor to perform operations comprising:
   identifying, for each pair of base station systems included in a plurality of base station systems, a degree of correlation of a transition of a degree of operation between the each pair of base station systems;
   classifying, based on the degree of correlation identified for the each pair of base station systems, the plurality of base station systems into a plurality of base station system groups;
   executing, for each of the plurality of base station system groups, operation control corresponding to the degree of operation of a leader base station system included in the each of the plurality of base station system groups, with respect to a follower base station system included in the each of the plurality of base station system groups; and
   removing, in accordance with a fact that a magnitude of a deviation of a ratio of the degree of operation of a follower base station system included in one of the plurality of base station system groups with respect to the degree of operation of a leader base station system included in the one of the plurality of base station system groups from a given reference ratio has satisfied a predetermined condition, the follower base station system from the one of the plurality of base station system groups.

2. The control system according to claim 1,
   wherein identifying the degree of correlation of the transition of the degree of operation comprises identifying the degree of correlation of the transition of the degree of operation for the each pair of base station systems based on transition data indicating the transition of the degree of operation of each of the plurality of base station systems,
   wherein the operations further comprise identifying, based on the transition data, the given reference ratio being the ratio of the degree of operation of the follower base station system included in the one of the plurality of base station system groups with respect to the degree of operation of the leader base station system included in the one of the plurality of base station system groups, and
   wherein removing comprises removing the follower base station system from the one of the plurality of base station system groups in accordance with a fact that a magnitude of a difference between a value indicating the degree of operation of the leader base station system included in the one of the plurality of base station system groups and a value obtained by dividing a value indicating the degree of operation of the follower base station system included in the one of the plurality of base station system groups by the given reference ratio has satisfied a predetermined condition.

3. The control system according to claim 1,
   wherein identifying the degree of correlation of the transition of degree of operation comprises identifying the degree of correlation of the transition of the degree of operation for the each pair of base station systems based on transition data indicating the transition of the degree of operation of each of the plurality of base station systems,
   wherein the operations further comprise identifying, based on the transition data, the given reference ratio being the ratio of the degree of operation of the follower base station system included in the one of the plurality of base station system groups with respect to the degree of operation of the leader base station system included in the one of the plurality of base station system groups, and
   wherein removing comprises removing the follower base station system from the one of the plurality of base station system groups in accordance with a fact that a magnitude of a difference between a value obtained by multiplying a value indicating the degree of operation of the leader base station system included in the one of the plurality of base station system groups by the given reference ratio and a value indicating the degree of operation of the follower base station system included in the one of the plurality of base station system groups has satisfied a predetermined condition.

4. The control system according to claim 2, wherein removing comprises removing the follower base station system satisfying a condition that a distribution of the differences identified a plurality of times is different from the distribution of another follower base station system, from the one of the plurality of base station system groups.

5. The control system according to claim 2, wherein removing comprises removing the follower base station system in which a magnitude of a variance or a standard deviation of the differences identified a plurality of times satisfies a predetermined condition, from the one of the plurality of base station system groups.

6. The control system according to claim 2, wherein removing comprises removing the follower base station system in which an average of the differences identified a plurality of times satisfies a predetermined condition, from the one of the plurality of base station system groups.

7. The control system according to claim 1, wherein the operations further comprise predicting the degree of operation of the leader base station system, wherein executing comprises executing operation control of the leader base station system based on the degree of operation being a result of the predicting, and wherein executing comprises executing the operation control of the follower base station system based on the degree of operation being the result of the predicting and on the given reference ratio.

8. The control system according to claim 1, wherein the operations further comprise determining, from among a plurality of base station systems included in the one of the plurality of base station system groups, the leader base station system based on the number of other base station systems in each of which the degree of correlation with respect to a corresponding one of the plurality of base station systems is larger than a predetermined magnitude.

9. The control system according to claim 1, wherein identifying the degree of correlation of the transition of the degree of operation comprises identifying, as the degree of correlation, a representative value of a cross-correlation coefficient of a value indicating the degree of operation.

10. The control system according to claim 1, wherein the degree of operation of each of the plurality of base station systems is a traffic amount or the number of accommodated persons in an area covered by the each of the plurality of base station systems.

11. A control method, comprising:

identifying, for each pair of base station systems included in a plurality of base station systems, a degree of correlation of a transition of a degree of operation between the each pair of base station systems;

classifying, based on the degree of correlation identified for the each pair of base station systems, the plurality of base station systems into a plurality of base station system groups;

executing, for each of the plurality of base station system groups, operation control corresponding to the degree of operation of a leader base station system included in the each of the plurality of base station system groups, with respect to a follower base station system included in the each of the plurality of base station system groups; and removing, in accordance with a fact that a magnitude of a deviation of a ratio of the degree of operation of a follower base station system included in one of the plurality of base station system groups with respect to the degree of operation of a leader base station system included in the one of the plurality of base station system groups from a given reference ratio has satisfied a predetermined condition, the follower base station system from the one of the plurality of base station system groups.

\* \* \* \* \*